(12) United States Patent
Hoffmann

(10) Patent No.: US 8,882,487 B2
(45) Date of Patent: Nov. 11, 2014

(54) EXTRUSION HEAD AS WELL AS AN EXTRUSION DEVICE FITTED WITH SUCH AN EXTRUSION HEAD

(75) Inventor: Wieland Hoffmann, Hannover (DE)

(73) Assignee: Troester GmbH & Co. KG, Hannover (DE)

( * ) Notice: Subject to any disclaimer, the term of this patent is extended or adjusted under 35 U.S.C. 154(b) by 504 days.

(21) Appl. No.: 12/900,712

(22) Filed: Oct. 8, 2010

(65) Prior Publication Data

US 2011/0086120 A1    Apr. 14, 2011

(30) Foreign Application Priority Data

Oct. 9, 2009 (DE) .......................... 10 2009 048 980

(51) Int. Cl.
| | |
|---|---|
| *B29C 47/08* | (2006.01) |
| *B29C 47/12* | (2006.01) |
| *B29C 47/36* | (2006.01) |
| *B29C 47/56* | (2006.01) |
| *B29C 47/38* | (2006.01) |
| *B29C 47/14* | (2006.01) |
| *B29C 47/06* | (2006.01) |
| *B29C 47/00* | (2006.01) |

(52) U.S. Cl.
CPC ............ *B29C 47/145* (2013.01); *B29C 47/385* (2013.01); *B29C 47/0019* (2013.01); *B29C 47/0818* (2013.01); *B29C 47/0023* (2013.01); *B29C 47/0822* (2013.01); *B29C 47/065* (2013.01); *B29C 47/56* (2013.01); *B29C 47/0052* (2013.01)

USPC .................... 425/188; 425/131.1; 425/376.1; 425/185; 425/192 R; 425/462

(58) Field of Classification Search
CPC   B29C 47/20; B29C 45/2673; B29C 47/0818; B29C 47/082; B29C 47/0822; B29C 47/0823; B29C 47/0825; B29C 47/0827; B29C 47/062; B29C 47/56; B29C 47/0018; B29C 47/083; B29C 47/128; B29C 47/145; B29C 47/122; B29C 47/14; B29C 47/24; B29C 47/38; B30B 11/221
USPC ....... 425/188, 192 R, 376.1, 461, 462, 131.1, 425/133.5, 185, 190, 224, 587
See application file for complete search history.

(56) References Cited

U.S. PATENT DOCUMENTS

| | | | | |
|---|---|---|---|---|
| 1,993,384 | A | * | 3/1935 | Royle ............................. 425/188 |
| 3,488,807 | A | * | 1/1970 | Vossen ....................... 425/192 R |
| 3,535,738 | A | * | 10/1970 | Vossen ....................... 425/192 R |
| 3,902,835 | A | * | 9/1975 | Theysohn ....................... 425/188 |
| 4,124,346 | A | * | 11/1978 | Greenwood et al. .......... 425/188 |
| 4,137,027 | A | * | 1/1979 | Ruger ......................... 425/133.5 |

(Continued)

FOREIGN PATENT DOCUMENTS

| | | |
|---|---|---|
| CN | 87107193 A | 6/1988 |
| CN | 100 486 794 C | 6/2006 |

(Continued)

*Primary Examiner* — Seyed Masoud Malekzadeh
(74) *Attorney, Agent, or Firm* — Leydig, Voit & Mayer, Ltd.

(57) ABSTRACT

An extrusion head configured for at least one extruder includes a flow channel a finishing die; and an opening in operative communication with the flow channel, wherein the opening is configured to at least partially accommodate a screw shaft of an additional extruder.

18 Claims, 2 Drawing Sheets

(56) References Cited

U.S. PATENT DOCUMENTS

| | | | |
|---|---|---|---|
| 4,318,677 A * | 3/1982 | Ullrich et al. | 425/183 |
| 4,329,133 A * | 5/1982 | Gallizia | 425/114 |
| 2,632,204 A | 3/1983 | Murray | |
| 4,416,605 A * | 11/1983 | Konno et al. | 425/185 |
| 4,515,738 A * | 5/1985 | Anders | 264/412 |
| 4,548,568 A * | 10/1985 | Herbert et al. | 425/131.1 |
| 4,619,599 A * | 10/1986 | Herbert et al. | 425/186 |
| 4,643,659 A | 2/1987 | Paul | |
| 4,652,224 A * | 3/1987 | Golisch | 425/131.1 |
| 4,653,994 A * | 3/1987 | Capelle | 425/131.1 |
| 4,666,392 A * | 5/1987 | Gerloff et al. | 425/190 |
| 4,683,095 A * | 7/1987 | Tolonen et al. | 264/173.12 |
| 4,728,279 A * | 3/1988 | Bellmer | 425/185 |
| 4,781,560 A * | 11/1988 | Herbert | 425/133.5 |
| 4,799,874 A * | 1/1989 | Bellmer et al. | 425/131.1 |
| 4,824,353 A * | 4/1989 | Hirschkorn | 425/190 |
| 4,832,590 A * | 5/1989 | Bellmer | 425/185 |
| 4,840,554 A * | 6/1989 | Hirschkorn | 425/190 |
| 4,892,473 A * | 1/1990 | Elia et al. | 425/197 |
| 4,983,113 A * | 1/1991 | Hirschkorn | 425/183 |
| 5,000,670 A * | 3/1991 | Capelle | 425/135 |
| 5,061,166 A | 10/1991 | Gohlisch et al. | |
| 5,076,777 A * | 12/1991 | Schmitt | 425/133.5 |
| 5,108,682 A * | 4/1992 | Tompkins et al. | 264/167 |
| 5,126,088 A | 6/1992 | Andres | |
| 5,242,290 A * | 9/1993 | Hiraiwa et al. | 425/131.1 |
| 5,332,380 A * | 7/1994 | Unland | 425/135 |
| 5,527,499 A | 6/1996 | Miley | 264/40.1 |
| 5,720,986 A * | 2/1998 | Gohlisch et al. | 425/131.1 |
| 5,851,561 A * | 12/1998 | Hirschkorn | 425/131.1 |
| 6,213,748 B1 * | 4/2001 | Bertram | 425/133.5 |
| 6,273,703 B1 * | 8/2001 | Hirschkorn | 425/188 |
| 6,294,119 B1 * | 9/2001 | Nakamura | 264/173.12 |
| 6,695,606 B1 * | 2/2004 | Burg et al. | 425/133.5 |
| 6,696,009 B2 * | 2/2004 | Davis | 264/510 |
| 7,309,223 B2 * | 12/2007 | Hasegawa | 425/192 R |
| 7,311,505 B2 * | 12/2007 | Ohki et al. | 425/133.5 |
| 7,704,064 B2 * | 4/2010 | Unland et al. | 425/188 |
| 8,206,142 B2 * | 6/2012 | Zhang et al. | 425/190 |
| 2004/0185132 A1 * | 9/2004 | Looman et al. | 425/192 R |
| 2005/0271761 A1 * | 12/2005 | Ohki et al. | 425/133.5 |
| 2006/0008549 A1 * | 1/2006 | Rigali et al. | 425/133.1 |
| 2006/0018987 A1 * | 1/2006 | Hasegawa | 425/192 R |
| 2009/0017148 A1 * | 1/2009 | Unland et al. | 425/131.1 |

FOREIGN PATENT DOCUMENTS

| | | |
|---|---|---|
| DE | 34 30 062 A1 | 2/1986 |
| DE | 244 722 A | 4/1987 |
| DE | 39 23 290 C1 | 12/1990 |
| DE | 0 747 243 A1 | 12/1996 |
| DE | 195 20 996 C2 | 1/2000 |
| EP | 0 925 903 A1 | 6/1999 |
| EP | 1 270 174 A1 | 6/2002 |
| EP | 1 060 089 B1 | 12/2008 |
| GB | 2 131 734 A | 6/1998 |
| JP | 60-259425 A | 12/1985 |
| JP | 04176627 A | 6/1992 |
| JP | 2002504455 A | 9/1999 |

* cited by examiner

EXTRUSION HEAD AS WELL AS AN EXTRUSION DEVICE FITTED WITH SUCH AN EXTRUSION HEAD

CROSS REFERENCE TO PRIOR APPLICATION

Priority is claimed to German Application No. DE 10 2009 048 980.0, filed Oct. 9, 2009, the entire disclosure of which is incorporated by reference herein.

FIELD

The invention relates to an extrusion head, especially one intended for one or more components for one or more extruders. Moreover, the invention relates to an extrusion device intended for one or more components and having one or more extruders and an extrusion head.

BACKGROUND

Such an extrusion device with an extrusion head is needed, for example, for the production of a tread for car tires. Nowadays, such tires are already made of four or more different mixtures bonded to each other, namely, the tread mixture, which consists of a highly abrasion-resistant material, the shoulder strip mixture, which consists of very millable material, the so-called rubber base mixture that serves as the substrate for the tread and that can be made of a softer mixture than the tread, and the so-called cushion-rubber mixture for good adhesion to the tire body. Therefore, four or more mixtures with very different viscosity values have to merge in one extrusion head to form the tread profile.

Electrostatic charges built up in vehicles not only cause electric discharges but also impair vehicle functions owing to possible spark formation. Such problems do not arise if the tire is made of rubber containing a large amount of carbon black since this causes the tire to be sufficiently conductive.

For financial reasons as well as for environmental considerations, there is a rising demand for tires that can reduce the fuel consumption of vehicles.

In tires that have a low rolling resistance, however, a considerable amount of the carbon black is replaced by silica, which increases the electric resistance of the tread rubber.

German patent specification DE 195 20 996 C2 discloses, for instance, a car tire with a tread made of electrically insulating or low-conductivity material, with a highly electroconductive layer that is located underneath the tread, with a strip of highly electroconductive material that forms part of the tread surface, and with a layer of highly electroconductive material arranged between the two abutting faces of the ring-shaped tread. As seen over the circumference of the tire, the highly electroconductive layer extends at least partially into the tire tread and is electrically connected to another highly electroconductive tire component which, in turn, is connected to the car body in a highly electroconductive manner.

Furthermore, European patent application EP 1 060 089 B1 also discloses a tire with a multilayered structure.

Tire components consisting of up to four different mixtures are produced in a single operation employing multiple extrusion heads. These aggregates—which are equipped with two, three or even more extruders mounted above one another and with matching extrusion heads—have replaced the older variants (boxer or Y-design arrangements). Arranging the extruders above one another in a single axis also allows a symmetrical shape of the flow channels. The channels have bores for sensors to measure the compound pressure and the temperature. The flow channel inserts are screwed into the lower part of the head so that they can be replaced quickly.

European patent application EP 0 925 903 A1 relates to a method and to a device for the production of a pneumatic tire comprising a tread rubber that can discharge electrostatic charges to the road surface. A device for the production of a non-vulcanized tread rubber is proposed, whereby at least one low-conductivity rubber and at least one highly conductive rubber are each fed to an extruder unit located upstream from a shared extrusion head. The rubber types flow through individual passages in the extrusion head and are united with each other at the rear of the extrusion die, before they are extruded out of the extrusion die as an integrated composite.

European patent application EP 1 270 174 A1 relates to an extrusion die for tire treads, comprising an outer tread passage to form an electrically non-conductive rubber outer tread as well as an inner tread passage to form an inner layer made up of an electroconductive rubber.

British patent GB 2 131 734 A discloses an extruder installation for creating flat profiles consisting of two different mixtures. The extruder head of the installation is split over two planes arranged above each other. The mid-part of the head is firmly joined to the extruders, while the upper part and the lower part are configured so that they can be swiveled.

In many operations, a profile strip change is performed relatively often, for instance, in order to produce treads for car and truck tires of different sizes or for special tires for earth-moving equipment.

Each change in the type of tread means that the flow channel inserts as well as the pre-forming bars also have to replaced.

SUMMARY OF THE INVENTION

Whereas in actual practice it has already been possible to combine four extruders in one single extrusion device, the installation of another extruder as an additional extruder requires extra space in the form of a so-called piggyback arrangement. For this purpose, the additional extruder is often installed in front of the outlet opening with an opposite or lateral conveying direction, so that its material flow has to be deflected. In actual practice, however, this arrangement has proven to be inconvenient since it hampers free access to the outlet area of the extrusion device.

An aspect of the present invention provides a simple extrusion head for several extruders, which facilitates handling in actual practice. Moreover, it should also be easily possible to install an additional extruder on an extrusion device, especially one having several extruders, without restricting the access.

Therefore, in an embodiment, an extrusion head is provided that has an opening leading to at least one flow channel or to an overlapping piece arranged between the finishing die and the flow channel, said opening at least partially accommodating a screw shaft of an additional extruder.

As a result, it has now become possible for the first time to install the additional extruder with little effort and without restricting access. In contrast, up until now, experts had assumed that long feed channels in the extrusion head were already unfavorable because the pressure conditions mean that the non-driven transport segment between the die of the additional extruder and the finishing die of the extrusion device will be too long, with an associated high flow resistance. In contrast, however, according to the invention, the screw shaft of the additional extruder extends far into the opening, so that the non-driven segment is reduced to a minimum. Therefore, with this configuration, the process part of the additional extruder extends all the way into the extrusion head.

Furthermore, experts have assumed that the installation of an additional extruder with a housing that surrounds the screw shaft would not only require a reconfiguration but also result in a severe and unacceptable weakening of the extrusion head if the die of this additional extruder were to open up in the vicinity of the flow channels of the extrusion device.

In contrast to this, according to the invention, the elimination of a separate housing for the screw shaft of the additional extruder accounts for a simple and inexpensive structure that can fundamentally be retrofitted, even in the case of existing extrusion heads. Here, the temperature of the cylinder sleeve of the additional extruder can be concurrently controlled by the extrusion head.

In this context, the opening preferably opens up into a flow channel that is separated from the other flow channels, so that the material flows only merge in the die.

As an alternative to feeding the material flow of the additional extruder into the flow channel of the extrusion device, the material flow can also be fed directly into the overlapping piece or into the cassette (pre-former) in the vicinity of the finishing die.

In this context, it is advantageous if the extrusion head has at least two head parts that can be moved with respect to each other, especially that can each be swiveled by a joint of its own, whereby the opening is located in at least one head part. If necessary, the appropriate head part can then be replaced in order to considerably simplify the retooling as well as the adaptation to different application purposes. In particular, this accounts for simple handling. Since in this case, the additional extruder can be swiveled together with the head part that supports it, access to the outlet area, for instance, for cleaning purposes, is not impaired.

The opening could basically have any desired cross-sectional shape, also one that is not rotation-symmetrical, whereby an appropriate sleeve having a cylindrical inner cross section is required in order to accommodate the screw shaft. In contrast, a very promising approach is for the opening to be configured cylindrically and, for instance, to be in the form of a bore in the extrusion head or in the head part, so that it essentially corresponds to the cross section of the screw shaft, or else it is dimensioned to be larger, so that the screw shaft can be dismantled in the direction of the tip.

In this context, in another embodiment of the invention that is particularly relevant in actual practice, the cylinder sleeve at least partially accommodates the screw shaft as a replaceable wearing part in the opening, whereby the adaptation to different screw shafts can also be attained by means of the cylinder sleeve. As a result, screw shafts of different diameters can be used without the need to change the opening.

Preferably, a cylinder sleeve configured as a reducing sleeve serves this purpose, so that even different material flows can be fed to screw shafts of different dimensions.

Another very promising approach is when the opening is arranged with an adjacent flow channel so as to enclose an acute angle and so as to be parallel to a main plane, or else it is arranged slanted with respect to said main plane for purposes of achieving a lateral feed. As a result, the material flow supplied by the additional extruder can be fed without problems into the area of the flow channel inserts that are preferably used in actual practice, or else directly in front of the finishing die in the flow direction into the overlapping piece, which is also referred to as a pre-forming bar. Likewise conceivable is a branch leading from the opening to the alternative flow deflection leading to the particular desired areas.

Naturally, the extrusion head can also have several openings, if applicable, to accommodate one or more screw shafts at different angular positions. The orientation of the opening here essentially corresponds, for instance, to the largest material thickness of the extrusion head. In contrast, it is also very advantageous in actual practice for the opening to be arranged parallel to the front of the extrusion head or head part. Parallel as used herein means essentially parallel.

Another likewise particularly practical configuration of the present invention is obtained when the opening can be closed vis-à-vis a flow channel or an overlapping piece by a closing device for purposes of preventing an undesired back-flow of the material flows from other extruders if the additional extruder is not in use. In its closed position, the closing device, which is configured, for instance, as a plug or slide valve, closes the flow channel in a way that it is flush along its contour.

In order to ensure good access, the head parts preferably can be pre-tensioned by means of a drive, especially a hydraulic cylinder, and can be swiveled into an open resting position that allows free access.

In an embodiment, an extrusion device is provided that allows easy installation of an additional extruder on the extrusion device, is achieved according to the invention by means of an extrusion device having one or more extruders and an extrusion head that has an opening leading to at least one flow channel, or having an overlapping piece arranged between the finishing die and the flow channel, said opening at least partially accommodating a screw shaft of an additional extruder. This translates into an advantageous arrangement that can be easily realized and that also does not restrict the space available in front of the outlet opening of the extrusion device. In particular, a very compact arrangement of the additional extruder is made possible in that its screw shaft projects far, especially extending until shortly before its opening, into the associated flow channel. Therefore, with this configuration, the process part of the additional extruder extends into the extrusion head, so that only the drive and its gear unit are mounted on the outside. At the same time, the small distance between the end of the screw shaft of the additional extruder and the flow channel reduces the non-driven transport segment to a minimum.

BRIEF DESCRIPTION OF THE DRAWINGS

The invention allows for various embodiments. In order to further elucidate the fundamental principle, one example is shown in the drawing and will be described below. The drawing shows a sectional side view in FIG. 1—of an extrusion head having an opening that opens up into a flow channel.

DETAILED DESCRIPTION

Figure 1:
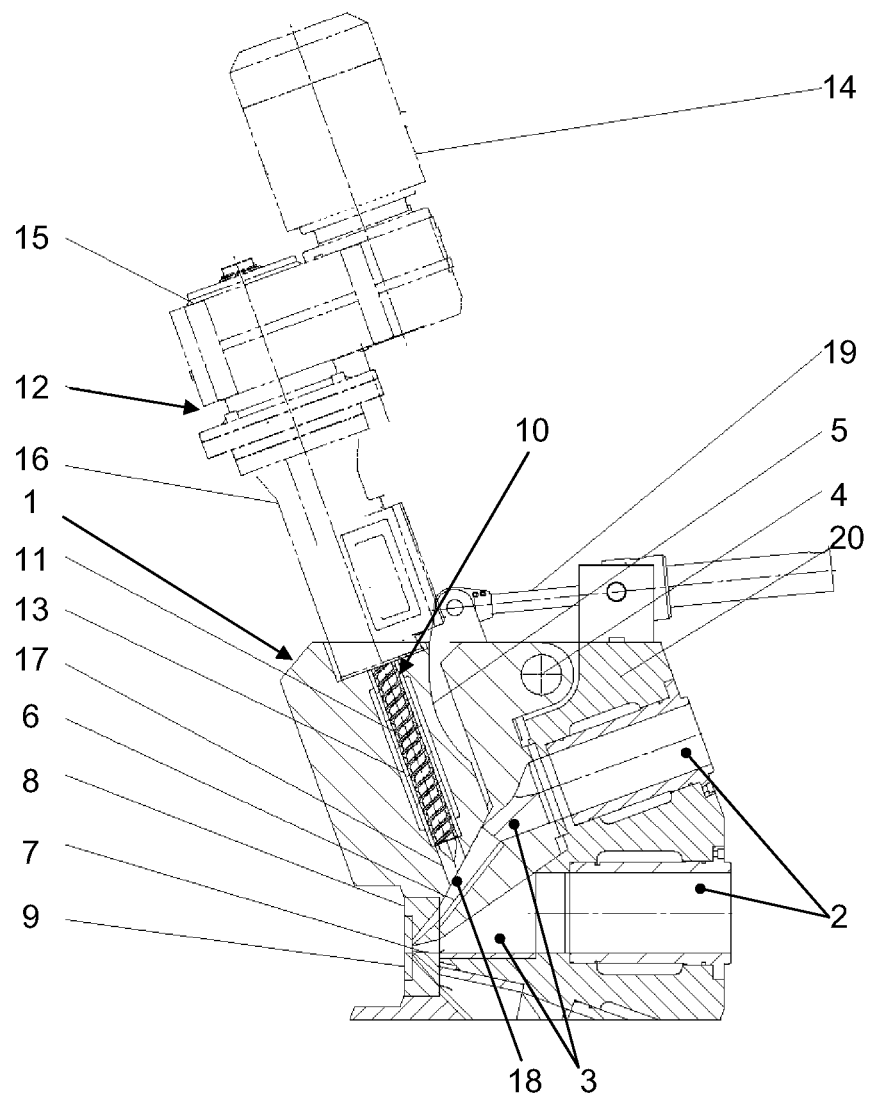
Figure 2:
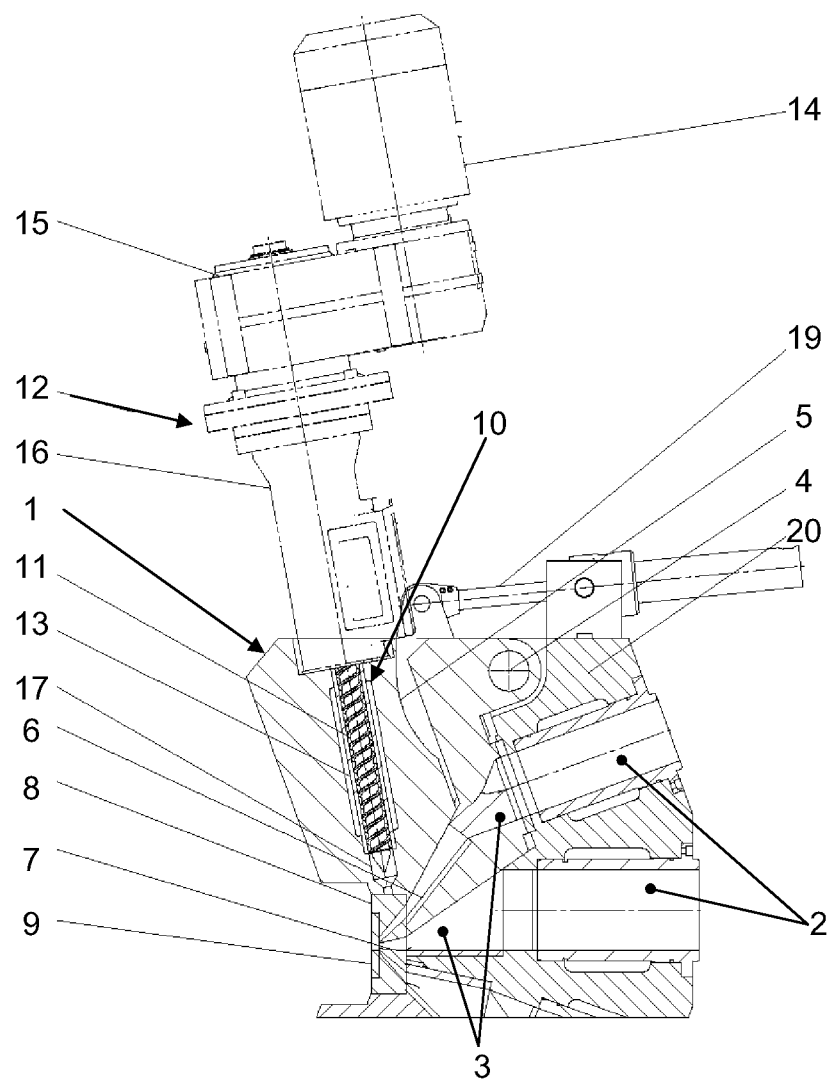
FIG. 2—of the extrusion head having an opening that opens up into the area of an overlapping piece.

The present invention will be explained in greater detail below making reference to FIGS. 1 and 2, each depicting a sectional side view of an extrusion head 1 of an extrusion device (not shown here) that combines several extruders 2. The figures show several flow channels 3 that are each associated with a corresponding extruder 2 and that are closed in the depicted working position of a head part 5 of the extrusion head 1 that can be swiveled around a joint 4. The material flows of the individual extruders 2 are united in a cassette 8 by means of a flow channel insert 6 in an overlapping piece 7, which is also referred to as a pre-forming bar, whereby the shaped strand emerges from the cassette via a finishing die 9 that forms the outlet. The head part 5, which is swivellably joined to the head mid-part 20 by means of a hydraulic cylinder 19, has an opening configured as a bore, and it serves to accommodate a screw shaft 11 of an additional extruder 12. In this context, the screw shaft 11 is installed in a cylinder sleeve 13 designed as a wearing part. The screw shaft 11 is driven by a drive 14 by means of a gear unit 15, whereby the material is fed through a hopper part 16. When the system is not in use, a closing device (not shown here) makes it possible to close the opening in a material channel 17 of the additional extruder 12 between the screw tip and the opening into an associated flow channel 18. Unlike the variant shown in FIG. 1, in which the opening 10 opens up into the appertaining flow channel 18—closed by the head part 5—of the additional extruder 12, in the variant shown in FIG. 2, the material flow of the additional extruder 12 is fed directly into the area of the cassette 8 for the overlapping piece 7.

What is claimed is:

1. An extrusion head configured for at least one extruder, the extrusion head comprising:
    a flow channel;
    a finishing die; and
    at least two head parts including at least one swivellable head part that is swivellable about a respective joint and is attached to an additional extruder such that the additional extruder is swivellable together with the at least one swivellable head part that supports the additional extruder, the at least one swivellable head part having an opening disposed therein that is in operative communication with the flow channel, wherein the opening is cylindrical and configured to at least partially accommodate a screw shaft of the additional extruder.

2. The extrusion head as recited in claim 1, further comprising an overlapping piece disposed between the finishing die and the flow channel, wherein the opening is in operative communication with the overlapping piece.

3. The extrusion head as recited in claim 1, further comprising an additional flow channel disposed inside of the flow channel, wherein the opening communicates with the additional flow channel.

4. The extrusion head as recited in claim 1, further comprising a cylinder sleeve disposed in the opening so as to at least partially accommodate the screw shaft.

5. The extrusion head as recited in claim 4, wherein the cylinder sleeve is a reducing sleeve.

6. The extrusion head as recited in claim 3, wherein the opening and the additional flow channel form an acute angle.

7. The extrusion head as recited in claim 1, wherein the opening is disposed parallel to a front of the extrusion head.

8. The extrusion head as recited in claim 1, wherein the opening is disposed parallel to one of the at least two head parts.

9. The extrusion head as recited in claim 1, further comprising a closing device configured to close the opening at one of the flow channel and an overlapping piece.

10. An extrusion device comprising:
    at least one extruder;
    an extrusion head including a flow channel, a finishing die and at least two head parts including at least one swivellable head part that is swivellable about a respective joint and is attached to an additional extruder such that the additional extruder is swivellable together with the at least one swivellable head part that supports the additional extruder, the at least one swivellable head part having an opening disposed therein that is in operative communication with the flow channel, wherein the opening is cylindrical and configured to at least partially accommodate a screw shaft of the additional extruder.

11. The extrusion device as recited in claim 10, wherein the extrusion head includes an overlapping piece disposed between the finishing die and the flow channel, wherein the opening is in operative communication with the overlapping piece.

12. The extrusion device as recited in claim 10, wherein the extrusion head includes an additional flow channel, wherein the opening communicates with the additional flow channel disposed inside of the flow channel.

13. The extrusion device as recited in claim 10, wherein the extrusion head includes a cylinder sleeve disposed in the opening so as to at least partially accommodate the screw shaft.

14. The extrusion device as recited in claim 13, wherein the cylinder sleeve is a reducing sleeve.

15. The extrusion device as recited in claim 12, wherein the opening and the additional flow channel form an acute angle.

16. The extrusion device as recited in claim 10, wherein the opening is disposed parallel to a front of the extrusion head.

17. The extrusion device as recited in claim 10, wherein the opening is disposed parallel to one of the at least two head parts.

18. The extrusion device as recited in claim 10, wherein the extrusion head includes a closing device configured to close the opening at one of the flow channel and an overlapping piece.

* * * * *